United States Patent
Koon

(10) Patent No.: US 6,947,941 B1
(45) Date of Patent: Sep. 20, 2005

(54) SERIAL NUMBER MASK AND CHECK DIGIT FOR ELECTRONIC REGISTRATION SYSTEM (ERS)

(75) Inventor: David G. Koon, Issaquah, WA (US)

(73) Assignee: Nintendo of America Inc., Redmond, WA (US)

( * ) Notice: Subject to any disclaimer, the term of this patent is extended or adjusted under 35 U.S.C. 154(b) by 0 days.

(21) Appl. No.: 09/831,018

(22) PCT Filed: Apr. 10, 2000

(86) PCT No.: PCT/US00/41057

§ 371 (c)(1),
(2), (4) Date: May 30, 2001

(87) PCT Pub. No.: WO01/27817

PCT Pub. Date: Apr. 19, 2001

Related U.S. Application Data

(60) Provisional application No. 60/159,432, filed on Oct. 14, 1999, provisional application No. 60/198,655, filed on Apr. 20, 2000.

(51) Int. Cl.$^7$ ............................................. G06F 17/30
(52) U.S. Cl. ...................................... 707/100; 705/16
(58) Field of Search ........................... 707/100, 104.1, 707/1; 705/16, 24, 27, 28

(56) References Cited

U.S. PATENT DOCUMENTS

| | | | |
|---|---|---|---|
| 5,256,863 A | 10/1993 | Ferguson et al. | ............... 705/21 |
| 5,372,386 A * | 12/1994 | Mills | ............................ 283/67 |
| 5,416,306 A | 5/1995 | Imahata | ...................... 235/380 |
| 5,602,377 A | 2/1997 | Beller et al. | ........... 235/462.15 |
| 5,889,270 A | 3/1999 | Van Haagen et al. | |
| 5,966,450 A | 10/1999 | Hosford et al. | |
| 5,978,774 A * | 11/1999 | Rogers et al. | ................. 705/24 |
| 6,016,480 A | 1/2000 | Houvener et al. | ............ 705/21 |
| 6,018,719 A | 1/2000 | Rogers et al. | ................. 705/24 |
| 6,131,088 A * | 10/2000 | Hill | ............................ 705/27 |
| 6,463,421 B2 * | 10/2002 | Junger | ........................ 705/28 |
| 6,542,933 B1 * | 4/2003 | Durst et al. | ................. 709/229 |
| 6,697,812 B1 * | 2/2004 | Martin | ........................ 707/100 |

* cited by examiner

*Primary Examiner*—Greta Robinson
(74) *Attorney, Agent, or Firm*—Nixon & Vanderhye P.C.

(57) ABSTRACT

A method and system for efficiently handling the acquisition of serial number information from products at, for example, a point of sale system in a retail store or the like utilizes a serial number mask (4) to generically define attributes of a serial number format. The serial number mask characterizes the serial number format and includes at least a first character that describes variables of the serial number format. With this method and system, an electronic registration system can be used to reduce or prevent improper returns of consumer products.

7 Claims, 1 Drawing Sheet

SERIAL NUMBER MASK AND CHECK DIGIT FOR ELECTRONIC REGISTRATION SYSTEM (ERS)

CROSS-REFERENCE TO RELATED APPLICATIONS

This application claims the benefit of U.S. Provisional Patent Application Ser. No. 60/159,432, filed Oct. 14, 1999 and U.S. Provisional Patent Application Ser. No. 60/198,655, filed Apr. 20, 2000, the entire contents of which are herein incorporated by reference.

Additionally, the present application is related to the following commonly-owned applications;

PCT/US99/26460 filed Nov. 10, 1999 (claiming priority from U.S. Provisional Application Ser. Nos. 60/108,170 filed Nov. 13, 1998 and 60/119,631 filed Feb. 11, 1999);

U.S. application Ser. No. 09/065,552 U.S. Pat. No. 6,085,172 filed Apr. 24, 1998, which is a continuation-in-part of U.S. application Ser. No. 08/725,259 filed Oct. 2, 1996 (now U.S. Pat. No. 6,018,719); and U.S. application Ser. No. 09/362,187 U.S. Pat. No. 6,757,663 filed Jul. 28, 1999 (which is a continuation of U.S. application Ser. No. 08/725,259 filed Oct. 2, 1996 and Ser. No. 09/314,023 filed May 19, 1999 (now U.S. Pat. Nos. 6,018,719 and 5,978,774, respectively)).

Each of the noted applications and patents is incorporated by reference herein in their entirety.

BACKGROUND OF THE INVENTION

This invention relates to the field of product serial numbers and their use in connection with an electronic registration system for such products. More particularly, the instant invention provides a method and system for efficiently handling the acquisition of serial number information from products at, for example, point of sale (POS) system in a retail store or the like. In addition, the instant invention provides manufacturers of products with an efficient, effective and versatile system for defining a serial number mask in connection with each universal product code (UPC), and which enables the serial numbers defined in accordance with the particular mask to be easily and accurately acquired by a POS system upon purchasing of the product for use by an electronic registration system (ERS) for the purchased products.

The instant invention is particularly advantageous when used in connection with, for example, an electronic product registration system designed to be used with different products and/or different product manufacturers. Examples of electronic registration systems (ERS) in which the instant invention may be used are described in the above-noted patent applications.

These electronic registration systems (ERS) facilitate compliance with return policies and are useful in reducing improper or fraudulent product returns under warranty, and may also provide related functionality to third parties and the like. Such electronic registration systems may also enable real time data storage and retrieval for the purpose of verifying and validating sales transaction data and product return/warranty repair eligibility. These ERS systems also enable efficient handling of product return transactions.

SUMMARY OF THE INVENTION

The noted ERS systems generally require that product serial number information be captured at the time of product purchase. Thus, the POS system or register needs to have the capability of scanning or otherwise acquiring the serial number information for purchased products for later transmittal to the ERS system. It is important in these ERS systems to verify the validity of serial numbers prior to storing them in the ERS database. The ability to collect and process a wide range of serial numbers without compromising the quality of the data collected is important to successful implementation of the ERS system. Typically, collection and implementation of serial numbers has required specific programming to ensure that the quality of the data collected is sound. It is thus desirable to develop generalized serial number handling capabilities that support implementation of a variety of serial number formats and also allow for an easy transition to allowing a single scan to identify a product and its serial number. The instant invention is designed to, for example, provide an improved method of defining serial numbers for each Universal Product Code (UPC), which method improves the efficiency and accuracy of ERS systems and/or other systems in which such information is utilized.

In an exemplary embodiment of the invention, a method of generically defining attributes of a serial number format includes defining a serial number mask that characterizes the serial number format, and providing the serial number mask with at least a first character that describes variables of the serial number format. The serial number mask may be provided with a second character that describes a check digit of the serial number format and/or a third character that describes constants of the serial number format. In the context of a check digit, a check digit algorithm may be attached to the serial number mask, which defines a manner of calculating the check digit of a particular serial number. In this context, the check digit algorithm is defined with six arguments, including starting position, ending position, direction, multiplier, multiplier position and multiplier reduction.

The step of providing the serial number mask with at least a first character may include providing the serial number mask with a plurality of the first characters corresponding to a number of variable digits in the serial number format. The serial number mask may be provided with a fourth character that describes a special constant identifier. In this context, the special constant identifier may be one of a UPC code for a product, a model number for the product, and a vendor specific code for the product, wherein the fourth character is different for each different special constant identifier.

In another exemplary embodiment of the invention, an information processing system having a product registration database containing information on purchased products and return criteria for purchased products stores the information by product serial number according to the serial number mask of the present invention. The serial number format for each purchased product includes an associated serial number mask.

In yet another exemplary embodiment of the invention, a method of reducing improper returns of consumer products includes receiving serial number formats of the consumer products, defining serial number masks that characterize the serial number formats, respectively, providing the serial number masks with at least a first character that describes variables of the serial number format, and storing a product registration program that effects storing and maintenance of a product registration database at a time of product purchase in accordance with the serial number masks.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

The method and system of the instant invention enables significant flexibility for manufacturers in assigning serial numbers, while also assuring that the serial numbers can be efficiently and accurately captured during a purchase transaction for use by an ERS.

A serial number can consist of three parts: constants, numeric variables and a check digit. According to manufacturer preferences, the constants and check digit are optional, and only the numeric variables are required. The serial number constants, variables and check digit need not necessarily maintain positional integrity to be masked according to the present invention. Moreover, typically, serial numbers are not case sensitive.

Figure 1:
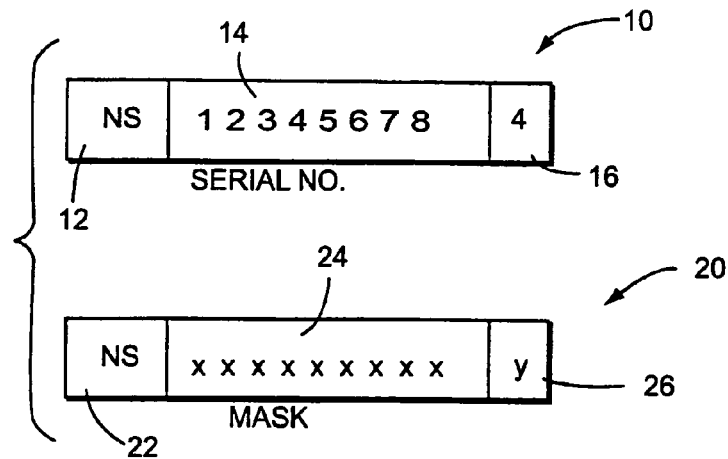
FIG. 1 is an exemplary product serial number and serial number mask according to the present invention.

An example of a serial number 10 is shown in FIG. 1. The serial number 10 contains constants 12, numeric variables 14, and a check digit 16. The total length of the serial number is eleven (11) digits.

The constants 12 are a part of the serial number that does not chance from serial number to serial number. There may be multiple constants in any given serial number format. They may be either a number, letter or special character, and they may be located in any portion of the serial number and there may be more than one constant block. Generally, constants can be any value. In some instances, constants may represent special values such as product number, model number, or UPC.

Variables 14 are the portion of the serial number that varies from number to number. The variables must typically be numeric, and it is preferred that there be only one variable section within a serial number format. Multiple variable sections in a single serial number can be supported by the ERS systems discussed above. In this context, when multiple variable sections are defined in a serial number, one of the multiple sections can be defined as a primary variable that is used to perform additional checks within the ERS application, including setting a lowest serial number that is valid for registration.

The check digit 16 allows for additional validation when a serial number is captured. The check digit is calculated from one contiguous range of the serial number and preferably can only be a single number from 0 to 9. The check digit is preferably located after the range on which it was calculated. Check digit calculation can vary from serial number to serial number, and an exemplary calculation according to the exemplary illustrated embodiment is discussed below.

With continued reference to FIG. 1, a serial number mask 20 generically defines attributes of a serial number format by including characters that characterize the serial number format. The generically defined attributes describe a serial number with upper and lower case characters and numbers. Preferably, upper case characters and numbers describe constant values that have no special meaning. Lower case characters preferably describe constants that have special meaning or describe variables.

With reference to the serial number 10 shown in FIG. 1, the mask 20 for the example serial number includes constants 22, defined as "NS" in positions 1 and 2, variables 24 defined as lower case "x" in positions 3–10, and a check digit 26 defined as a lower case "y" in position 11.

Since serial numbers are not case sensitive, the upper case "NS" could represent any combinations of lower or upper case "NS" in a serial number (i.e., "NS," "ns," "Ns," or "nS"). In some cases, the constant section(s) of a serial number may represent some special meaning such as a UPC code for a product, a model number for the product, or a vendor specific code for the product. For example, the following special constant identifiers can be used to identify these constants:

"a"—when the lower case "a" is used, it represents a constant portion of the serial number that will be the UPC code for a given product;

"b"—when the lower case "b" is used, it represents a constant portion of the serial number that is the model number for that product;

"c"—when the lower case "c" is used, it represents a constant portion of the serial number that is used to identify the product that is vendor specific (i.e., something other than a model or UPC number).

The use of special format characters allows for additional processing against a serial number such as single scan product identification and serial number collection. As an example, consider the following UCC standard format. For a product with UCC 128 standard format (01)004549663025 (21)NS123456784, the mask for this could look like "(01) 004549663025(21)NSxxxxxxxxy." To allow additional flexibility, however, the following mask could also be used to represent the product serial number format "(01) aaaaaaaaaaaa(21)NSxxxxxxxxy." In this case, the "a" segment is used to split out the product identification portion of the serial number.

Variables 24 in the mask refer to a fixed length portion of the serial number that may vary in value. This variable portion of the serial number gives the serial number its uniqueness to a particular product. As shown, the mask character to identify variables is "x." Preferably, the variable portion of the serial number must be numeric and ascend in value to effect minimum registration value edits. As discussed in the noted related patent applications, it may be desirable to set a minimum registration value for product return processing, so that fraudulent returns can be minimized. For example, an older product having a serial number lower than the minimum registration value could be flagged by the system as invalid, thereby preventing product return.

The check digit section 26 of the serial number mask is described using a lower case "y." As noted and further described below, the check digit is a value that is calculated on at least a portion of the variable part of the serial number and possibly the entire serial number.

With respect to UPC and multiple mask definition, the use of UPC is typically to identify a product at point of sale. The UPC, however, is not required in using masking. All that is required is that a product has some unique identifier to relate to a mask or masks. Although it is preferable that each product identifier have only one mask, it is possible that a given product identifier may have more than one mask. This may be required when a product of the same UPC or product identifier has more than one serial number format. Edits using the mask must check for multiple mask definitions to ensure the validity of the serial number being collected. A special mask definition character such as "i" can be used to maintain a high level of validity checking in special cases such as when engineering revision and/or color codes are built into serial numbers. The special mask definition characters can be effective for validity checking (e.g., length of the particular portion of a serial number), while ignoring the contents of that section of the serial number.

Consider the following exemplary serial number: 17563164PR1302C121. The mask for this serial number could be: "xxxxxxxxPR1302C121." The last four digits of this number, however, in this example are the engineering code for this product and could change several times a year, requiring the definition of a mask for each unique engineering code. A better way to implement masking in this context is to use the "i" special definition character. In this context, the mask would be "xxxxxxxxPR1302iiii." Thus, one mask will work for all serial numbers even if the serial number changes according to a modified engineering code.

Figure 2:
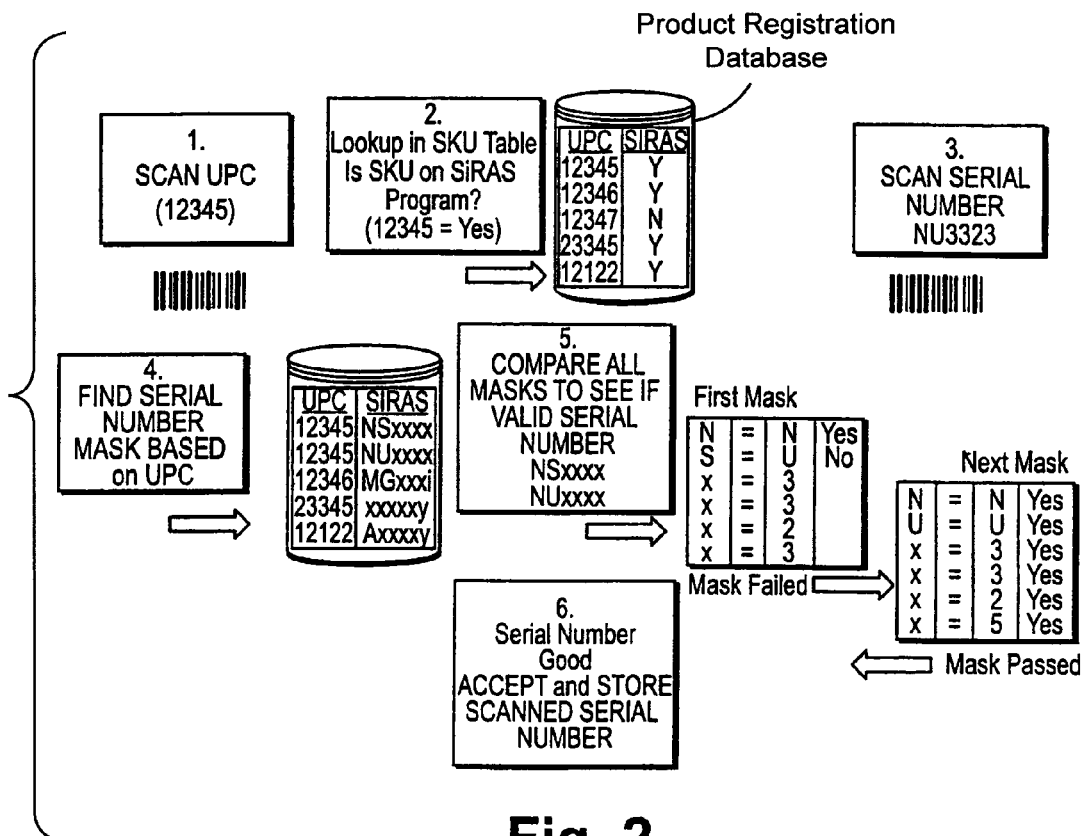
FIG. 2 is a flow diagram illustrating a process of using a serial number mask.

FIG. 2 is an exemplary flow diagram, illustrating a process of using the mask. Generally, the process encompasses the comparison of the serial number collected from a particular product against a predefined format of that serial number to see if the serial number collected is valid. The predetermined format is the mask according to the present invention.

At a point of sale, in step 1, a retailer or the like scans a UPC code from a product being purchased. A computer or like information processing system compares the scanned UPC to corresponding numbers stored in a table to determine whether this product is included in the ERS application, such as a SiRAS program (step 2). The product serial number is then scanned in step 3. Based on the UPC, the system finds the stored serial number mask in step 4. In step 5, the system compares all masks to determine if the serial number is a valid serial number. As shown, the scanned UPC has two masks (NSxxxx and NUxxxx), although it is preferred that each product correspond only to one mask. In the illustrated example, however, two masks are associated with the scanned UPC. As shown, the first mask is compared, and it is determined that the mask failed. When the second mask is compared, the mask is passed, and in step 6, the system determines that the serial number is valid.

A check digit for a serial number is generally known, and any number of check digit algorithms could be implemented with the serial numbers according to the present invention. As noted above, it is preferable that the check digit be a single number from 0 to 9.

Using the example serial number shown in FIG. 1, an exemplary procedure for determining a check digit will be described. In this example, six arguments are addressed and answered to define how the check digit is calculated. Of course, these arguments are only answered when a check digit is placed in the mask. The arguments include:
1. Starting position of the range used to calculate the check digit. (3)
2. Ending position of the range used to calculate the check digit. (10)
3. Directional as Left to Right, or Right to Left (R-L)
    When taking the example 12345678, and trying to determine which numbers are in an even position, and which numbers are in an odd position, this tells the algorithm which direction to start from. In this case, the direction is from right to left. Thus all odd position numbers are 8, 6, 4, and 2. All even position numbers are 7, 5, 3 and 1.
4. Multiplier of odd or even positioned numbers. (3)
    In the example above, the multiplier chosen is 3. This is a number that can range from 1 to 9, and is set by the client (e.g. manufacturer).
5. Multiply on all odd positions or even positions (O). See argument 3.
    In the example above, the odd position numbers are multiplied by 3. This is also decided by the client (e.g. manufacturer).
6. Reduce single multiplier. (N)
    When multiplying the positional numbers by the multiplier 3, there are two ways the multiplication can be performed. First, the sum of all the numbers can be multiplied by 3, or each number can be multiplied by 3, and reduce the value to a single digit. See below for each technique. For the example serial number, the first option will be used.

| (1) | $8 + 6 + 4 + 2 = 20 \cdot 3 = 60$ | |
| --- | --- | --- |
| | Multiply | Reduce |
| (2) | $8 \cdot 3 = 24$ | $2 + 4 = 6$ |
| | $6 \cdot 3 = 18$ | $1 + 8 = 9$ |
| | $4 \cdot 3 = 12$ | $1 + 2 = 3$ |
| | $2 \cdot 3 = 6$ | (no reduction needed) |
| | $6 + 9 + 3 + 6 = 24$ | |

Notice with option (1), the value is 60, but with option (2) the value is 24. Each option will produce a different result. For this example serial number, option (1) will be used.

When each of the six arguments are answered, the definition is stored in the following notation:
    3,10,R-L,3,O,N Therefore, the value of the check digit is calculated as follows:

| | |
| --- | --- |
| ODD POSITIONS | $8 + 6 + 4 + 2 = 20 \cdot 3 = 60$ |
| EVEN POSITIONS | $7 + 5 + 3 + 1 = 16$ |
| SUM OF RESULTS | $16 + 60 = 76$ |
| LAST DIGIT OF RESULT | $10 - 6 = 4$ |
| SUBTRACTED FROM 10 (I.E., Mod 10) | |

The check digit value based on the above definition would be 4.
So for the example NS123456784;
Mask=Nsxxxxxxxxy
Check Digit Algorithm=3,10,R-L,3,O,N If the range for the check digit algorithm contains character constants (in the above example, if the starting position was "1" or "2", character constants "N" or "NS" would be included in the algorithm), a conversion table must be picked from the list of conversion tables set up in the ERS system. If the range of data used to calculate the serial number does not have any alpha characters, then the conversion table does not have to be assigned.

The following is an example conversion table definition used by the U.S. Postal Service:
    A=1, B=2, C=3, D=4, E=5, F=6, G=7, H=8, I=9, J=10, K=11, L=12, M=13, N=14, O=15, P=0, Q=1, R=2, S=3, T=4, U=5, V=6, W=7, X=8, Y=9, Z=10

The conversion is effected by zeroing out the lower 4 bits of each byte, thus producing the conversion number.

In another aspect of the invention, the mask may be defined in a manner that enables the system (ERS system, POS system, or other related system) to determine if the mask is a packaging mask or a product mask. A packaging mask is defined as a mask for serial numbers used only on packaging for products, while a product mask is defined as a mask for serial numbers used only on actual products. One example embodiment of this feature of the invention is to define certain elements (such as certain constants) in the mask to be used only with serial numbers on product packaging, and to define different constants for use only with serial numbers on actual products. In this manner, the POS or ERS system could determine upon reading the serial number whether the actual product or only the product packaging has been scanned or otherwise obtained.

One benefit of this optional feature of the invention, is that fraudulent returns can be minimized or prevented. More particularly, by using this technique, the fraudulent return situation can be avoided where a person purchases a new product with new packaging and then returns the new packaging with an old or different product therein for credit or refund. The invention reduces this type of fraud by requiring that an actual product be scanned, rather than only the packaging returned with the product. In other words, the POS or ERS system could be programmed to recognize during a product return transaction whether only the packaging serial number has been scanned and prevent acceptance of the return until the actual product is scanned, thereby assuring that the actual product, not just the packaging, qualifies for return.

The instant invention provides an advantageous method of enabling manufacturers to assign a serial number mask for each UPC, while also enabling the serial numbers used to be easily captured during a product transaction for input to an electronic registration system (ERS) or the like. A POS system would then have access to information that would enable it to know what mask to use for each UPC, thereby enabling the correct serial number to be obtained and verified during the product purchase transaction.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of reducing improper returns of consumer products, the method comprising:
   receiving serial number formats of the consumer products;
   defining serial number masks that characterize the serial number formats, respectively;
   providing the serial number masks with at least a first character that describes variables of the serial number format;
   storing a product registration program that effects storing and maintenance of a product registration database at a time of product purchase in accordance with the serial number masks; and
   providing the serial number mask with a second character that describes a check digit of the serial number format.

2. A method according to claim 1, further comprising providing the serial number mask with a third character that describes constants of the serial number format.

3. A method according to claim 1, further comprising attaching a check digit algorithm to the serial number mask, wherein the check digit algorithm defines a manner of calculating the check digit of a particular serial number.

4. A method according to claim 3, further comprising defining the check digit algorithm with six arguments, including starting position, ending position, direction, multiplier, multiplier position, and multiplier reduction.

5. A method according to claim 1, wherein the step of providing the serial number mask with at least a first character comprises providing the serial number mask with a plurality of the first characters corresponding to a number of variable digits in the serial number format.

6. A method according to claim 5, further comprising providing the serial number mask with a fourth character that describes a special constant identifier.

7. A method according to claim 6, wherein the special constant identifier is one of a UPC code for a product, a model number for the product, and a vendor specific code for the product, and wherein the fourth character is different for each different special constant identifier.

* * * * *